(12) United States Patent
Zeng et al.

(10) Patent No.: US 10,776,176 B2
(45) Date of Patent: Sep. 15, 2020

(54) SERVICE CONTROL METHOD AND SERVICE CONTROL APPARATUS (71) Applicant: Huawei Technologies Co., Ltd., Shenzhen (CN)

(72) Inventors: Xiaosheng Zeng, Shenzhen (CN); Kai Xin, Shanghai (CN); Xiaowen Dong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 45 days.

(21) Appl. No.: 16/054,605

(22) Filed: Aug. 3, 2018

(65) Prior Publication Data
US 2018/0342870 A1 Nov. 29, 2018

Related U.S. Application Data (63) Continuation of application No. PCT/CN2016/091697, filed on Jul. 26, 2016.

(30) Foreign Application Priority Data

Feb. 5, 2016 (CN) .......................... 2016 1 0081988

(51) Int. Cl.
G06F 9/50 (2006.01)
G06Q 30/02 (2012.01)
(Continued)

(52) U.S. Cl.
CPC ....... G06F 9/5094 (2013.01); G06Q 30/0206 (2013.01); G06Q 50/06 (2013.01);
(Continued)

(58) Field of Classification Search
None
See application file for complete search history.

(56) References Cited

U.S. PATENT DOCUMENTS 9,201,486 B2 12/2015 Jagadishprasad et al.
2008/0040296 A1* 2/2008 Bridges ................. G01D 4/004
705/412
(Continued)

FOREIGN PATENT DOCUMENTS

CN 103490956 A 1/2014
CN 104065098 A 9/2014
(Continued)

OTHER PUBLICATIONS

Machine Translation and Abstract of Chinese Publication No. CN103490956, Jan. 1, 2014, 26 pages.
(Continued)

Primary Examiner — Sean Shechtman
(74) Attorney, Agent, or Firm — Conley Rose, P.C.

(57) ABSTRACT

A service control method and a service control apparatus, where the method includes obtaining, a current electricity grid electricity price and a quantity of to-be-executed services, determining an electricity price threshold according to the quantity of the to-be-executed services, decreasing, by the service control apparatus, a quantity of services that are about to be executed by a first quantity when the current electricity grid electricity price is greater than the electricity price threshold, and executing a service according to a reduced quantity of services that are about to be executed, or increasing, by the service control apparatus, a quantity of services that are about to be executed by a second quantity, and executing a service according to an increased quantity of services that are about to be executed when the current electricity grid electricity price is less than the electricity price threshold.

16 Claims, 3 Drawing Sheets (51) Int. Cl.
*G06Q 50/06* (2012.01)
*H02J 3/14* (2006.01)
(52) U.S. Cl.
CPC .............. *H02J 3/14* (2013.01); *H02J 2310/64* (2020.01); *Y02D 10/28* (2018.01); *Y04S 10/58* (2013.01); *Y04S 20/224* (2013.01)

(56) References Cited

U.S. PATENT DOCUMENTS

| | | | |
|---|---|---|---|
| 2011/0029461 | A1 | 2/2011 | Hardin, Jr. |
| 2011/0040417 | A1* | 2/2011 | Wolfe ..................... G06F 1/206 700/291 |
| 2011/0178959 | A1 | 7/2011 | Nakajima et al. |
| 2012/0180055 | A1* | 7/2012 | Brech ................... G06F 9/4893 718/102 |
| 2013/0086404 | A1* | 4/2013 | Sankar .................... G06F 1/305 713/324 |
| 2016/0092978 | A1* | 3/2016 | Lian ....................... G06Q 30/08 705/412 |

FOREIGN PATENT DOCUMENTS

| | | |
|---|---|---|
| CN | 104217111 A | 12/2014 |
| CN | 104239966 A | 12/2014 |
| CN | 104268681 A | 1/2015 |
| CN | 104680339 A | 6/2015 |
| CN | 104915725 A | 9/2015 |

OTHER PUBLICATIONS

Machine Translation and Abstract of Chinese Publication No. CN104915725, Sep. 16, 2015, 22 pages.
Foreign Communication From a Counterpart Application, Chinese Application No. 201610081988.8, Chinese Office Action dated May 8, 2019, 5 pages.
Zhou, Z., et al., "On arbitrating the power-performance tradeoff in SaaS clouds," XP032440834, Proceedings IEEE INFOCOM, Apr. 14, 2013, pp. 872-880.
Foreign Communication From a Counterpart Application, European Application No. 16889007.7, Extended European Search Report dated Dec. 7, 2018, 8 pages.
Machine Translation and Abstract of Chinese Publication No. CN104065098, Sep. 24, 2014, 24 pages.
Machine Translation and Abstract of Chinese Publication No. CN104217111, Dec. 17, 2014, 17 pages.
Machine Translation and Abstract of Chinese Publication No. CN104239966, Dec. 24, 2014, 20 pages.
Machine Translation and Abstract of Chinese Publication No. CN104268681, Jan. 7, 2015, 16 pages.
Machine Translation and Abstract of Chinese Publication No. CN104680339, Jun. 3, 2015, 12 pages.
Foreign Communication From a Counterpart Application, PCT Application No. PCT/CN2016/091697, English Translation of International Search Report dated Oct. 31, 2016, 2 pages.
Foreign Communication From a Counterpart Application, PCT Application No. PCT/CN2016/091697, English Translation of Written Opinion dated Oct. 31, 2016, 3 pages.
Liu, S., et al., "Profit Aware Load Balancing for Distributed Cloud Data Centers," IEEE 27th International Symposium on Parallel & Distributed Processing, XP032444481, May 20, 2013, pp. 611-622.

* cited by examiner

SERVICE CONTROL METHOD AND SERVICE CONTROL APPARATUS

CROSS-REFERENCE TO RELATED APPLICATIONS

This application is a continuation of International Patent Application No. PCT/CN2016/091697 filed on Jul. 26, 2016, which claims priority to Chinese Patent Application No. 201610081988.8 filed on Feb. 5, 2016. The disclosures of the aforementioned applications are hereby incorporated by reference in their entireties.

TECHNICAL FIELD

The present disclosure relates to the communications field, and in particular, to a service control method and a service control apparatus.

BACKGROUND

A data center consumes a large amount of electricity, and currently, a power level of electricity use of a data center ranges from several megawatts to several hundreds of megawatts. As the information technology (IT) industry develops, a power of electricity use of a data center increases continuously. Therefore, electricity expenses occupy a considerably large proportion in operation costs of a data center. It is of great significance to reduce electricity expenses of a data center.

In other approaches, there is a method for controlling electricity expenses of a data center, and the method is applied to a time-of-use price. In a high-electricity-price period (that is, a peak period of electricity consumption) of each cycle (usually one day), load is decreased, and in a low-electricity-price period (that is, a trough period of electricity consumption), load is increased, thereby reducing electricity expenses of a data center.

As to a time-of-use price, generally, the government specifies the peak period (for example, 8 o'clock to 22 o'clock) of electricity consumption and the trough period (for example, 22 o'clock to 8 o'clock of the next day) of electricity consumption, and determines an electricity price of each period. The peak period of electricity consumption and the trough period of electricity consumption are obtained according to empirical statistics collection in the long run, and are relatively constant and will not be changed arbitrarily.

In the other approaches, a data center adjusts load based on the peak period of electricity consumption and the trough period of electricity consumption. However, the peak period of electricity consumption and the trough period of electricity consumption are relatively constant and both last for a relatively long time, but a quantity of services changes in real time, and load also changes in real time. Consequently, a cycle of adjusting load by a data center is relatively long. This affects load adjustment precision, and does not help control costs of electricity expenses.

SUMMARY

Embodiments of the present disclosure provide a service control method and a service control apparatus, to precisely adjust load and reduce costs of electricity expenses.

In view of this, a first aspect of the present disclosure provides a service control method. The method may be applied to a time-of-use price, and may also be applied to a spot electricity price. The method includes obtaining, by a service control apparatus, a current electricity grid electricity price and a quantity of to-be-executed services, determining, by the service control apparatus, an electricity price threshold according to the quantity of the to-be-executed services, where the quantity of the to-be-executed services is positively correlated with the electricity price threshold, and if the current electricity grid electricity price is greater than the electricity price threshold, decreasing, by the service control apparatus, a quantity of services that are about to be executed by a first quantity, and executing a service according to a reduced quantity of services that are about to be executed, or if the current electricity grid electricity price is less than the electricity price threshold, increasing, by the service control apparatus, a quantity of services that are about to be executed by a second quantity, and executing a service according to an increased quantity of services that are about to be executed.

In an embodiment of the present disclosure, an electricity price threshold in the embodiment of the present disclosure depends on a quantity of to-be-executed services such that load is adjusted not only based on a current electricity grid electricity price, and the quantity of the to-be-executed services is also considered. The quantity of the to-be-executed services changes in real time, and therefore, a cycle of adjusting the load is relatively short such that adjustment precision can be improved and costs of electricity expenses can be reduced.

With reference to the first aspect of the present disclosure, in a possible design, determining, by the service control apparatus, an electricity price threshold according to the quantity of the to-be-executed services includes obtaining, by the service control apparatus, a target relationship factor, and setting, by the service control apparatus, a product of the target relationship factor and the quantity of the to-be-executed services as the electricity price threshold.

In an embodiment of the present disclosure, by means of obtaining the target relationship factor that is directly correlated with the quantity of the to-be-executed services, the electricity price threshold corresponding to the quantity of the to-be-executed services can be obtained accurately.

It may be understood that in a possible design, obtaining, by the service control apparatus, a target relationship factor includes obtaining, by the service control apparatus, a first relationship parameter and a second relationship parameter, where the first relationship parameter is a parameter of a relationship between an electricity expenses reducing rate and the relationship factor, the second relationship parameter is a parameter of a relationship between the quantity of the to-be-executed services and the relationship factor, the electricity expenses reducing rate is positively correlated with the relationship factor, and the quantity of the to-be-executed services is positively correlated with the relationship factor, and performing, by the service control apparatus, calculation according to the first relationship parameter and the second relationship parameter such that a relationship factor obtained when an equilibrium value is maximum is used as the target relationship factor, where the equilibrium value is positively correlated with the electricity expenses reducing rate, and the equilibrium value is inversely correlated with the quantity of the to-be-executed services.

In an embodiment of the present disclosure, for a data center, a greater electricity expenses reducing percentage is more desirable, but a smaller average value of the quantities of the to-be-executed services is more desirable. By means of selecting a relationship factor obtained when an equilibrium value of the electricity expenses reducing rate and the quantity of the to-be-executed services is maximum as a target relationship factor, reduction of electricity expenses of the data center can be best adjusted.

With reference to the first aspect of the present disclosure, it may be understood that in a possible design, performing, by the service control apparatus, calculation according to the first relationship parameter and the second relationship parameter such that a relationship factor obtained when an equilibrium value is maximum is used as the target relationship factor includes determining, by the service control apparatus, the target relationship factor $\hat{v}$ in the following manner:

$$\hat{v} = \underset{v \in V}{\operatorname{argmax}}\{M(v)\}; \text{ and } M(v) = \frac{\alpha * C(v)}{\beta * Q(v)},$$

where v is a relationship factor, V is a value range of the relationship factor, M(v) is an equilibrium value, C(v) is an electricity expenses reducing rate, Q(v) is a quantity of to-be-executed services, α is a first coefficient used to represent a weight of the electricity expenses reducing rate, and β is a second coefficient used to represent a weight of the quantity of the to-be-executed services.

With reference to the first aspect of the present disclosure, optionally, in an embodiment of the present disclosure, determining, by the service control apparatus, an electricity price threshold according to the quantity of the to-be-executed services includes obtaining, by the service control apparatus, a sample data set o=($P_{th}$, Q) of the electricity price threshold and the quantity of the to-be-executed services by means of an offline test, where in the sample data set, the electricity price threshold $P_{th}$ is a dependent variable $P_{th}$, and the quantity Q of the to-be-executed services is an independent variable q, and calculating, by the service control apparatus, the electricity price threshold according to the sample data set.

With reference to the first aspect of the present disclosure, optionally, in an embodiment of the present disclosure, calculating, by the service control apparatus, the electricity price threshold according to the sample data set using a regression analysis method includes determining, by the service control apparatus, the electricity price threshold in the following manner:

$$\hat{p}_{th} = a + bq; \text{ and } \varphi = \min \sum_{\phi} (p_{th,i} - \hat{p}_{th,i})^2;$$

that is, $$\varphi = \min \sum_{\phi} (p_{th,i} - a - bq_i)^2,$$

where $\hat{p}_{th}$ is a predictor of $p_{th}$, a and b are to-be-determined coefficients, φ is a residual (sum of squares, i is an element symbol of the sample data set, and ($p_{th,i}$, $q_i$) represents an $i^{th}$ element pair in the sample data set.

In an embodiment of the present disclosure, a calculation method is further provided. By extracting a particular amount of sample data, a regression equation of the electricity price threshold and the quantity of the to-be-executed services can be solved using the least square method. Using this calculation method, a relationship between the electricity price threshold and the quantity of the to-be-executed services can be more accurately calculated.

With reference to the first aspect of the present disclosure, in a possible design, the method further includes, if the current electricity grid electricity price is greater than the electricity price threshold, calculating, by the service control apparatus, a first difference between the current electricity grid electricity price and the electricity price threshold, and calculating, by the service control apparatus, the first quantity according to the first difference, or if the current electricity grid electricity price is less than the electricity price threshold, calculating, by the service control apparatus, a second difference between the current electricity grid electricity price and the electricity price threshold, and calculating, by the service control apparatus, the second quantity according to the second difference.

In an embodiment of the present disclosure, a quantity, by which services need to be increased or decreased, of services that are about to be executed can be calculated accurately according to a difference between a current electricity grid electricity price and an electricity price threshold in order to best resolve a problem of reducing electricity expenses of a data center.

It should be noted that in a possible design, the service control apparatus uses the first difference as $P_{th}(\hat{p}_{th})$ substitutes $P_{th}(\hat{p}_{th})$ into an equation $P_{th}=V*Q$ or $\hat{p}_{th}=a+bq$, and reversely calculates Q(q) as a value of the first quantity, and the service control apparatus uses the second difference as $P_{th}(\hat{p}_{th})$ substitutes the second difference into the equation $P_{th}=V*Q$ or $\hat{P}_{th}=a+bq$, and reversely calculates Q(q) as a value of the second quantity.

It should be noted that in a possible design, the decreasing, by the service control apparatus, a quantity of services that are about to be executed by a first quantity includes moving, by the service control apparatus, the first quantity of deferrable services from the services that are about to be executed, to a queue of the to-be-executed services, or allocating, by the service control apparatus, the first quantity of deferrable services from the services that are about to be executed, to a first data center of a different region, where a current first electricity grid electricity price of the different region that is obtained by the first data center of the different region is less than the current electricity grid electricity price.

In an embodiment of the present disclosure, a real-time service cannot be deferred such that only a deferrable service is moved out from the services that are about to be executed, thereby avoiding unnecessary data transmission interference.

It should be noted that in another possible design, increasing, by the service control apparatus, a quantity of services that are about to be executed by a second quantity includes extracting, by the service control apparatus, the second quantity of services from the to-be-executed services, and adding the second quantity of services to a queue of the services that are about to be executed, or obtaining, by the service control apparatus, the second quantity of services from a second data center of a different region, and adding the second quantity of services to a queue of the services that are about to be executed, where a current second electricity grid electricity price of the different region that is obtained by the second data center of the different region is greater than the current electricity grid electricity price.

In an embodiment of the present disclosure, in a big data era, data centers in different places may coordinate with each other to process a service, a data center in a region in which a current electricity grid electricity price is greater than an electricity price threshold may send a deferrable service to a data center in a region in which a current electricity grid electricity price is less than an electricity price threshold for processing in order to best coordinate data centers in different places to process the service, and achieve an objective of reducing electricity expenses.

A second aspect of the present disclosure provides a service control apparatus, where the service control apparatus includes modules configured to execute the method in the first aspect and the possible designs of the first aspect, and the service control apparatus may include an obtaining module configured to obtain a current electricity grid electricity price and a quantity of to-be-executed services, a determining module configured to determine an electricity price threshold according to the quantity of the to-be-executed services, where the quantity of the to-be-executed services is positively correlated with the electricity price threshold, a comparison module configured to compare values of the current electricity grid electricity price and the electricity price threshold, an allocation module configured to decrease a quantity of services that are about to be executed by a first quantity if the current electricity grid electricity price is greater than the electricity price threshold, or increase a quantity of services that are about to be executed by a second quantity if the current electricity grid electricity price is less than the electricity price threshold, and an execution module configured to execute a service according to a reduced or increased quantity of services that are about to be executed.

With reference to the second aspect of the present disclosure, in a possible design, the determining module is configured to obtain a target relationship factor, and the determining module is configured to use a product of the target relationship factor and the quantity of the to-be-executed services as the electricity price threshold.

It may be understood that in a possible design, the determining module is configured to obtain a first relationship parameter and a second relationship parameter, where the first relationship parameter is a parameter of a relationship between an electricity expenses reducing rate and the relationship factor, the second relationship parameter is a parameter of a relationship between the quantity of the to-be-executed services and the relationship factor, the electricity expenses reducing rate is positively correlated with the relationship factor, and the quantity of the to-be-executed services is positively correlated with the relationship factor, and the determining module is configured to perform calculation according to the first relationship parameter and the second relationship parameter such that a relationship factor obtained when an equilibrium value is maximum is used as the target relationship factor, where the equilibrium value is positively correlated with the electricity expenses reducing rate, and the equilibrium value is inversely correlated with the quantity of the to-be-executed services.

With reference to the second aspect of the present disclosure, it may be understood that in a possible design, the determining module is configured to determine the target relationship factor $\hat{v}$ in the following manner:

$$\hat{v} = \underset{v \in V}{\mathrm{argmax}}\{M(v)\}; \text{ and } M(v) = \frac{\alpha * C(v)}{\beta * Q(v)},$$

where v is a relationship factor, V is a value range of the relationship factor, M(v) is an equilibrium value, C(v) is an electricity expenses reducing rate, Q(v) is a quantity of to-be-executed services, α is a first coefficient used to represent a weight of the electricity expenses reducing rate, and β is a second coefficient used to represent a weight of the quantity of the to-be-executed services.

With reference to the second aspect of the present disclosure, optionally, the determining module may further be configured to obtain a sample data set $\phi=(P_{th}, Q)$ of the electricity price threshold and the quantity of the to-be-executed services by means of an offline test, where in the sample data set, the electricity price threshold $P_{th}$ is a dependent variable $p_{th}$, and the quantity Q of the to-be-executed services is an independent variable q, and the determining module is configured to calculate the electricity price threshold according to the sample data set.

With reference to the second aspect of the present disclosure, optionally, the determining module is configured to determine the electricity price threshold in the following manner:

$$\hat{p}_{th} = a + bq; \text{ and}$$
$$\varphi = \min \sum_{\phi} (p_{th,i} - \hat{p}_{th,i})^2;$$

that is, $$\varphi = \min \sum_{\phi} (p_{th,i} - a - bq_i)^2,$$

where $\hat{p}_{th}$ is a predictor of $p_{th}$, a and b are to-be-determined coefficients, φ is a residual sum of squares, i is an element symbol of the sample data set, and $(p_{th,i}, q_i)$ represents an $i^{th}$ element pair in the sample data set.

With reference to the second aspect of the present disclosure, in a possible design, the allocation module is configured to calculate a first difference between the current electricity grid electricity price and the electricity price threshold if the current electricity grid electricity price is greater than the electricity price threshold, calculate the first quantity according to the first difference, calculate a second difference between the current electricity grid electricity price and the electricity price threshold if the current electricity grid electricity price is less than the electricity price threshold, and calculate the second quantity according to the second difference.

It should be noted that in a possible design, the allocation module is configured to move the first quantity of deferrable services from the services that are about to be executed, to a queue of the to-be-executed services, or allocate the first quantity of deferrable services from the services that are about to be executed, to a first data center of a different region, where a current first electricity grid electricity price of the different region that is obtained by the first data center of the different region is less than the current electricity grid electricity price.

It should be noted that in another possible design, the allocation module is configured to extract the second quantity of services from the to-be-executed services, and add the second quantity of services to a queue of the services that are about to be executed, or obtain the second quantity of services from a second data center of a different region, and add the second quantity of services to a queue of the services that are about to be executed, where a current second electricity grid electricity price of the different region that is obtained by the second data center of the different region is greater than the current electricity grid electricity price.

A third aspect of the present disclosure provides an entity apparatus of a service control apparatus, including an input apparatus, an output apparatus, a processor, and a memory, where by calling an operation instruction stored in the memory, the service control apparatus is configured to perform the following steps of obtaining a current electricity grid electricity price and a quantity of to-be-executed services, determining an electricity price threshold according to the quantity of the to-be-executed services, where the quantity of the to-be-executed services is positively correlated with the electricity price threshold, and if the current electricity grid electricity price is greater than the electricity price threshold, decreasing a quantity of services that are about to be executed by a first quantity, and executing a service according to a reduced quantity of services that are about to be executed, or if the current electricity grid electricity price is less than the electricity price threshold, increasing a quantity of services that are about to be executed by a second quantity, and executing a service according to an increased quantity of services that are about to be executed.

It can be learned from the foregoing technical solutions that the embodiments of the present disclosure have the following advantages.

In the embodiments of the present disclosure, the service control apparatus may determine an electricity price threshold according to a quantity of to-be-executed services, compare the electricity price threshold and a current electricity grid electricity price, and when the current electricity grid electricity price is greater than the electricity price threshold, decrease a quantity of services that are about to be executed, or when the current electricity grid electricity price is less than the electricity price threshold, increase a quantity of services that are about to be executed. The electricity price threshold in the embodiments of the present disclosure depends on the quantity of the to-be-executed services such that load is adjusted not only based on a current electricity grid electricity price, and the quantity of the to-be-executed services is also considered. The quantity of the to-be-executed services changes in real time, and therefore, a cycle of adjusting the load is relatively short such that adjustment precision can be improved and costs of electricity expenses can be reduced.

DESCRIPTION OF EMBODIMENTS

Embodiments of the present disclosure provide a service control method and a service control apparatus, to improve adjustment precision and reduce costs of electricity expenses.

To make persons skilled in the art understand the technical solutions in the present disclosure better, the following clearly describes the technical solutions in the embodiments of the present disclosure with reference to the accompanying drawings in the embodiments of the present disclosure.

In the specification, claims, and accompanying drawings of the present disclosure, the terms "first," "second," "third," "fourth," and so on (if existent) are intended to distinguish between similar objects but do not necessarily indicate a specific order or sequence. It should be understood that the data termed in such a way is interchangeable in proper circumstances so that the embodiments described herein can be implemented in other orders than the order illustrated or described herein. Moreover, the terms "include," "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, product, or device.

Figure 1:
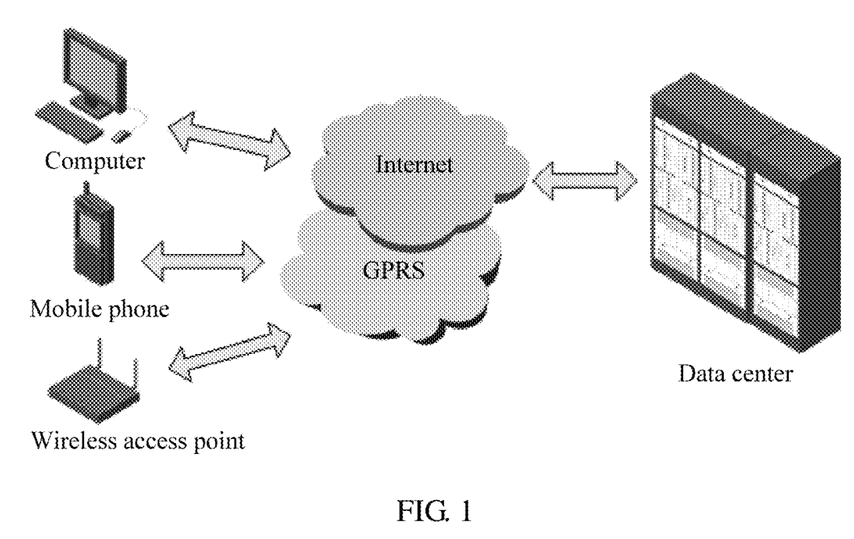
FIG. 1 is an architectural diagram of a network of a data center according to an embodiment of the present disclosure.

A data center is a particular globally cooperative device network, and is used to transfer, accelerate, display, calculate, and store data information on Internet network infrastructure. As shown in FIG. 1, when performing services, a computer, a mobile phone, or a wireless access point can upload data of the services to a data center through an Internet network or a General Packet Radio Service (GPRS) network, and the data center calculates, stores, or feeds back the data. As shown in a statistical report made by the technical committee 9.9 (TC9.9) of the American Society of Heating, Refrigerating, and Air-conditioning Engineers (ASHRAE), energy consumption of servers accounts for 46%, air conditioning and refrigerating account for 31%, uninterruptible power source (UPS) accounts for 8%, illumination accounts for 4%, and others account for 11%. It may be seen that when a data center processes data, energy consumption of the data center accounts for approximately one half of total energy consumption of the data center, that is, energy consumption of servers accounts for 46%. Energy consumption of this part is a critical part of the energy consumption of the data center, and a decrease in the energy consumption of this part has a determinative effect on reducing costs of electricity expenses of the data center.

In the other approaches, there is a method for controlling electricity expenses of a data center, and the method is applied to a time-of-use price. That is, in a high-electricity-price period, load is reduced, in a low-electricity-price period, load is increased, and an adjustment cycle is usually one day. But in real life, load of a data center changes in real time during one day, and simply dividing one day into two periods to adjust load cannot effectively reduce costs of electricity expenses of the data center.

Moreover, as electricity grids develop continuously, currently, a spot electricity price solution has appeared, and may probably be a mainstream electricity price solution in the future. The solution refers to an electricity price that dynamically changes in real time. Changes are frequent, an electricity price curve is a non-linear curve, the entire electricity price curve cannot be known in advance, and only an electricity price in a relatively short time (for example, 15 minutes) in the future can be known.

A high-electricity-price period and a low-electricity-price period are not constant in the spot electricity price solution. Therefore, load cannot be adjusted accurately according to the other approaches, and control precision of electricity expenses of a data center is affected consequently.

Embodiments of the present disclosure provide a service control method and a service control apparatus. The service control apparatus may determine an electricity price threshold according to a quantity of to-be-executed services, compare the electricity price threshold and a current electricity grid electricity price, and when the current electricity grid electricity price is greater than the electricity price threshold, decrease a quantity of services that are about to be executed, or when the current electricity grid electricity price is less than the electricity price threshold, increase a quantity of services that are about to be executed. The electricity price threshold in the embodiments of the present disclosure depends on the quantity of the to-be-executed services such that load is adjusted not only based on a current electricity grid electricity price, and the quantity of the to-be-executed services is also considered. The quantity of the to-be-executed services changes in real time, and therefore, a cycle of adjusting the load is relatively short such that adjustment precision can be improved and costs of electricity expenses can be reduced.

For ease of understanding, the following describes in detail the service control method in an embodiment of the present disclosure. It may be understood that this embodiment of the present disclosure may be applied to a time-of-use price scenario, and may also be applied to a spot electricity price scenario. A technical solution of the present disclosure is further applied to any other computer cluster that implements the spot electricity price policy and has a deferrable service. With reference to a structural topology diagram of a data center shown in FIG. 2, referring to FIG. 3, an embodiment of the service control method in the embodiments of the present disclosure includes the following steps.

Figure 3:
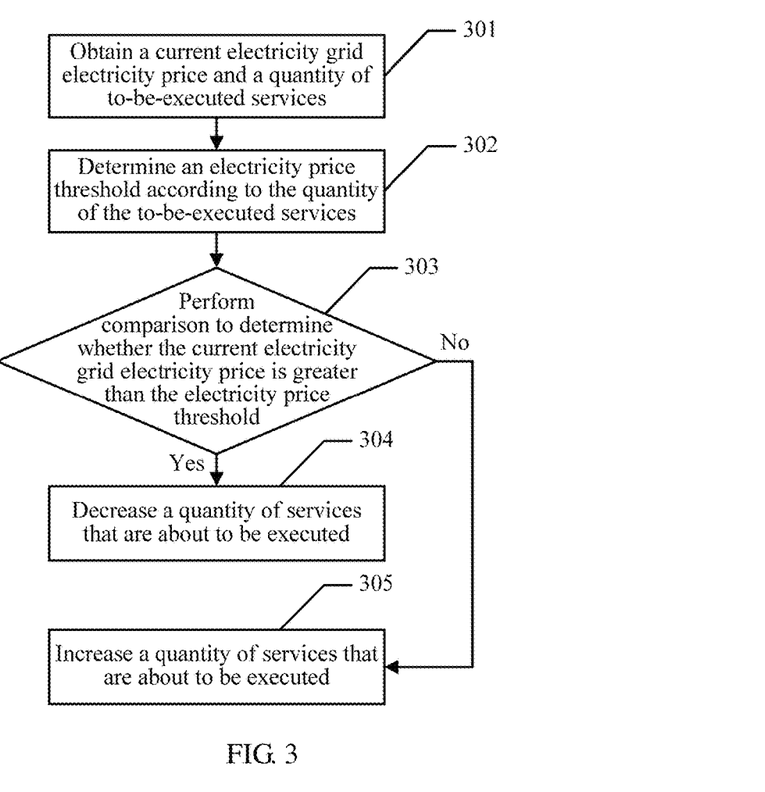
FIG. 3 is a schematic diagram of an embodiment of a service control method according to an embodiment of the present disclosure.

Step 301: A service control apparatus obtains a current electricity grid electricity price and a quantity of to-be-executed services.

Figure 2:
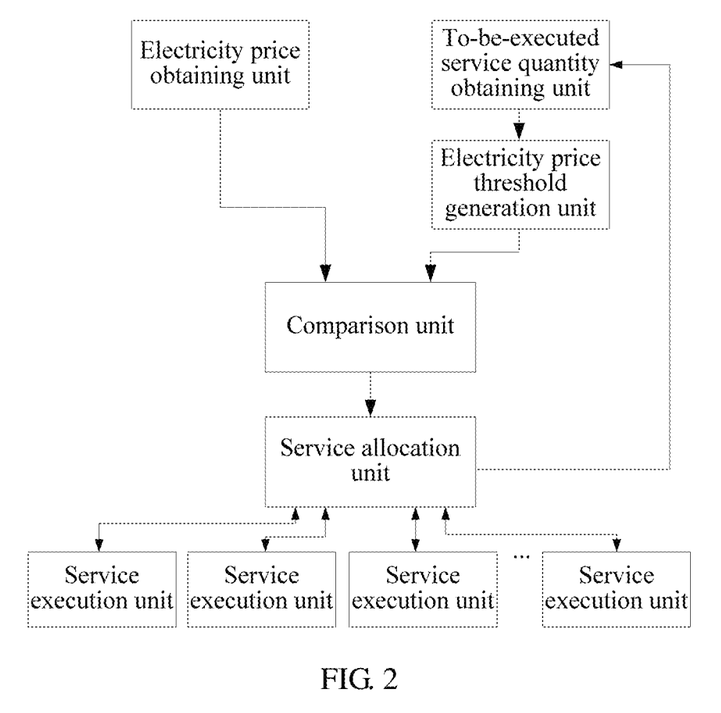
FIG. 2 is a structural topology diagram of a data center according to an embodiment of the present disclosure.

In this embodiment, as shown in FIG. 2, an electricity price obtaining unit may communicate with an electricity price sending apparatus of an electricity supplier except the data center through the Internet to obtain the current electricity grid electricity price. It should be noted that the service control apparatus may obtain the current electricity grid electricity price once a cycle and the cycle may be 15 minutes.

A to-be-executed service quantity obtaining unit may communicate with a service allocation unit that is configured to allocate a service and that is inside the service control apparatus to obtain information about the current quantity of to-be-executed services. The to-be-executed services may be services requested at a current time for execution, or may be services that were requested before a current time but were delayed.

Herein, it should be noted that in this embodiment of the present disclosure, a service processed by the data center may be classified into a real-time service and a deferrable service. The real-time service such as a call service or a video call service is a non-deferrable service that is highly sensitive to time, requires a timely response, and has a relatively high requirement for delay and needs to be processed immediately, where a shorter response time is more desirable. The deferrable service is a batch processing service that is less sensitive to time and has a specific time window for execution, and it is acceptable as long as the service is completed in the time window. For example, a computing service that analyzes user behaviors in a data center of an electronic commerce platform company is a batch processing service and may be completed offline.

Step 302: The service control apparatus determines an electricity price threshold according to the quantity of the to-be-executed services.

In this embodiment, the to-be-executed services change along with time, and when an electricity price threshold generation unit shown in FIG. 2 calculates the electricity price threshold based on the quantity of the to-be-executed services, the electricity price threshold changes along with the quantity of the to-be-executed services. It may be understood that the electricity price threshold is positively correlated with the quantity of the to-be-executed services, that is, when the quantity of the to-be-executed services increases, the electricity price threshold increases, and when the quantity of the to-be-executed services decreases, the electricity price threshold decreases.

Only a positive correlation between the electricity price threshold and the quantity of the to-be-executed services is defined in this embodiment of the present disclosure, and a specific relational function thereof may have various forms, which include but are not limited to the following functional relational expressions.

Figure 4:
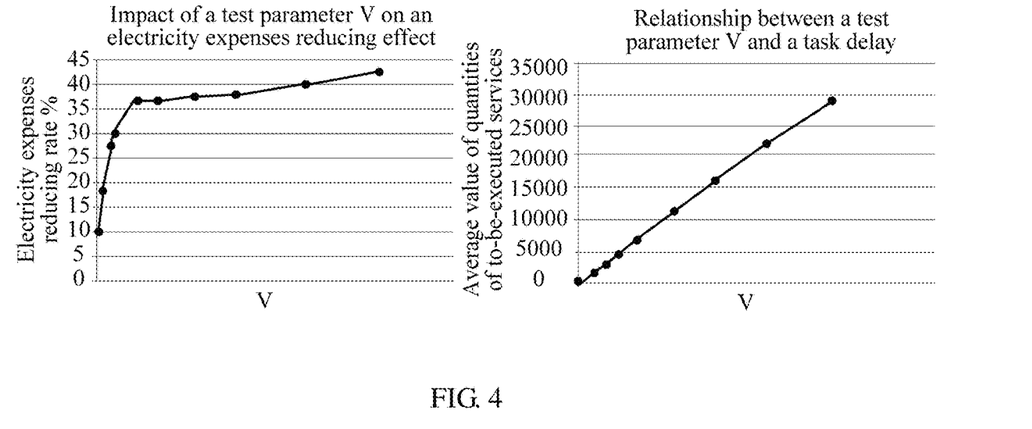
FIG. 4 is a data analysis diagram of a test parameter V according to an embodiment of the present disclosure.

Functional relational expression 1:

It is assumed that a relationship between an electricity price threshold $P_{th}$ and a quantity $Q$ of to-be-executed services is:

$$P_{th}=V*Q,$$

where a target relationship factor $V$ is a to-be-determined test parameter. A group of values of $V$ in ascending order are first assumed according to experience, in a same test condition (a same spot electricity price curve and a same load curve are used in a same test cycle), each $V$ is tested once, electricity expenses reducing percentages and average values of quantities of to-be-executed services in test results are compared subsequently, and a relatively appropriate value of $V$ is determined, thereby determining the relational expression between the electricity price threshold $P_{th}$ and the quantity $Q$ of the to-be-executed services. For example, as shown in FIG. 4, as $V$ increases, a changing curve (left) of an electricity expenses reducing percentage and a changing curve (right) of an average value of quantities of to-be-executed services are obtained by means of tests. It may be seen that as $V$ increases, both the electricity expenses reducing percentage and the average value of the quantities of to-be-executed services increase.

However, in an actual application, for the data center, a greater electricity expenses reducing percentage is more desirable, but a smaller average value of the quantities of to-be-executed services is more desirable. As shown in FIG. 4, the average value of the quantities of to-be-executed services is basically directly proportional to the value of $V$, but as the value of $V$ increases, the electricity expenses reducing percentage first increases rapidly, and then increases slowly. A value of $V$ at an inflection point may be selected, and an average value of the quantities of the to-be-executed services that corresponds to the value of $V$ is relatively small. Therefore, when both needs to be considered to determine the value of $V$, the target relationship factor $\hat{v}$ may be determined in the following manner:

$$\hat{v} = \underset{v \in V}{\mathrm{argmax}}\{M(v)\}; \text{ and}$$

$$M(v) = \frac{\alpha * C(v)}{\beta * Q(v)},$$

where in the expression, v is a relationship factor, V is a value range of the relationship factor, M(v) is an equilibrium value, C(v) is an electricity expenses reducing rate, Q(v) is a quantity of to-be-executed services, α is a first coefficient used to represent a weight of the electricity expenses reducing rate, and β is a second coefficient used to represent a weight of the quantity of the to-be-executed services.

Functional relational expression 2:

A data mining analysis method may be used herein, for example, cluster analysis, regression analysis, Bayes analysis, variance analysis, or a machine learning method is used, for example, an adaptive learning system, a neural network, a support vector machine, or a traditional optimization method, to obtain a relationship between the electricity price threshold and the quantity of the to-be-executed services. For example, using the regression analysis method, a sample data set $\phi=(P_{th}, Q)$ of the electricity price threshold and the quantity of the to-be-executed services is obtained by means of an offline test. The electricity price threshold $P_{th}$ is considered as a dependent variable $p_{th}$, the quantity Q of the to-be-executed services is considered as an independent variable q, and a regression analysis prediction equation of $p_{th}$ and q is created. The regression analysis prediction equation may be a higher order equation, such as a first-order equation:

$\hat{p}_{th}=a+bq$ where $\hat{p}_{th}$ is a predictor of $p_{th}$, and a and b are to-be-determined coefficients.

For all elements in the sample data set φ, values of a and b may be obtained by solving the equation below:

$$\varphi = \min \sum_{\phi} (p_{th,i} - \hat{p}_{th,i})^2,$$

that is, $$\varphi = \min \sum_{\phi} (p_{th,i} - a - bq_i)^2,$$

where φ is a residual sum of squares, i is an element symbol of the sample data set, and $(p_{th,i}, q_i)$ represents an $i^{th}$ element pair in the sample data set. The to-be-determined coefficients a and b may be determined by solving an element pair that enables the residual sum of squares φ to be minimum, and after values of a and b are determined, a regression analysis model for the electricity price threshold and the quantity of the to-be-executed services is obtained.

Step 303: The service control apparatus performs comparison to determine whether the current electricity grid electricity price is greater than the electricity price threshold, and if yes, step 304 is performed, or if no, step 305 is performed.

In this embodiment, as shown in FIG. 2, after a comparison unit in the service control apparatus obtains an electricity price threshold obtained through calculation by the electricity price threshold generation unit, the comparison unit may compare the electricity price threshold with the current electricity grid electricity price obtained from the electricity price obtaining unit. In a comparison manner, values are simply compared, or comparison may be performed in other manners. This is not limited herein.

Step 304: The service control apparatus decreases a quantity of services that are about to be executed.

In this embodiment, as shown in FIG. 2, after learning, by means of comparison, that the current electricity grid electricity price is greater than the electricity price threshold, the service allocation unit in the service control apparatus may obtain through calculation a first difference between the current electricity grid electricity price and the electricity price threshold, and may calculate, according to the first difference, the first quantity, by which services need to be reduced, of the services that are about to be executed. A calculation manner may be setting the first difference as $P_{th}$ ($\hat{p}_{th}$), substituting $P_{th}$ ($\hat{p}_{th}$) into an equation $P_{th}=V*Q$ or $\hat{p}_{th}=a+bq$, and reversely calculating Q(q) as a value of the first quantity. The calculation manner may further be a calculation manner in other forms. This is not limited herein.

In this embodiment, the service allocation unit may select the first quantity of deferrable services from a queue of the services that are about to be executed, and move the first quantity of deferrable services to a queue of the to-be-executed services. The first quantity of deferrable services may be sequentially selected according to a reverse chronological order of time points at which deferrable services join the queue of the services that are about to be executed, or may be sequentially selected according to an ascending order of weights of services, from the queue of the services that are about to be executed. This is not limited herein.

It should be noted that in this embodiment, the service allocation unit may select only the deferrable services.

It should be noted that the service allocation unit and data centers of different regions may further synchronize with each other using the Internet, and mutually upload a current electricity grid electricity price of a region at which a data center is located. When the service control apparatus obtains a current first electricity grid electricity price of the different region that is less than the current electricity grid electricity price, the service control apparatus may allocate the first quantity of deferrable services from the services that are about to be executed to a first data center of a different region.

In this embodiment, as shown in FIG. 2, a service execution unit in the service control apparatus executes a service according to a quantity of services that are about to be executed and that are obtained after the service allocation unit decreases the services. It should be noted herein that there may be multiple service execution units.

Step 305: The service control apparatus increases a quantity of services that are about to be executed.

In this embodiment, as shown in FIG. 2, after learning, by means of comparison, that the current electricity grid electricity price is less than the electricity price threshold, the service allocation unit in the service control apparatus may obtain through calculation a second difference between the current electricity grid electricity price and the electricity price threshold, and may calculate, according to the second difference, the second quantity, by which services need to be increased, of the services that are about to be executed. A calculation manner may be setting the second difference as $P_{th}$ ($\hat{p}_{th}$), substituting $P_{th}$ ($\hat{p}_{th}$) into an equation $P_{th}=V*Q$ or $\hat{p}_{th}=a+bq$, and reversely calculating Q(q) as a value of the second quantity. The calculation manner may further be a calculation manner in other forms. This is not limited herein.

In this embodiment, the service allocation unit may select the second quantity of services from a queue of the to-be-executed services, and add the second quantity of services to the queue of the services that are about to be executed. The second quantity of services may be sequentially selected according to a chronological order of time points at which the services join the queue of the to-be-executed services, or may be sequentially selected in descending order of weights of the services, from the to-be-executed services. This is not limited herein.

It should be noted that in this embodiment, the service allocation unit may preferentially select a real-time service.

It should be noted that the service allocation unit and data centers of different regions may further synchronize with each other using the Internet, and mutually upload a current electricity grid electricity price of a region at which a data center is located. When the service control apparatus obtains a current second electricity grid electricity price of the different region that is greater than the current electricity grid electricity price, the service control apparatus may obtain the second quantity of services from the second data center of the different region, and add the second quantity of services to the queue of the services that are about to be executed.

In this embodiment, as shown in FIG. 2, a service execution unit in the service control apparatus executes a service according to a quantity of the services that are about to be executed and that are obtained after the service allocation unit increases the services. It should be noted herein that there may be multiple service execution units.

In this embodiment, if the current electricity grid electricity price is equal to the electricity price threshold, the service execution unit may perform no processing, and maintain the quantity of the services that are about to be executed unchanged.

For ease of understanding, in a specific application scenario of this embodiment of the present disclosure, assuming that a current electricity grid electricity price is 1.1 Yuan/kilowatt hour (kWh), a quantity of to-be-executed services is 6000, and 0.0001 is selected as a value of a target relationship factor V through a test, the functional relational expression 1 may be solved as follows:

$$P_{th}=V*Q=0.0001\times 6000=0.6.$$

An electricity price threshold is 0.6 Yuan/kWh, and in this case, the current electricity grid electricity price is greater than the electricity price threshold, and a first difference 0.5 between the current electricity grid electricity price and the electricity price threshold may be obtained through calculation.

The quantity Q of the services that are about to be executed may be obtained through reverse calculation according to the foregoing equation and using the first difference 0.5 as $P_{th}$, as shown in the following expression:

$$0.5=0.0001\times Q, \text{ that is, } Q=5000.$$

Based on the foregoing descriptions, when the current electricity grid electricity price is greater than the electricity price threshold, the service control apparatus decreases the quantity of the services that are about to be executed by 5000.

The case in which the current electricity grid electricity price is greater than the electricity price threshold is described above. In a case in which the current electricity grid electricity price is not greater than the electricity price threshold, for example, assuming that the current electricity grid electricity price is 1.1 Yuan/kWh, a quantity of to-be-executed services is 6000, and 0.0002 is selected as a value of a target relationship factor V through a test, the functional relational expression 1 may be solved as follows:

$$P_{th}=V*Q=0.0002\times 6000=1.2.$$

An electricity price threshold is 1.2 Yuan/kWh, and in this case, the current electricity grid electricity price is less than the electricity price threshold, and a second difference 0.1 between the current electricity grid electricity price and the electricity price threshold may be obtained through calculation.

The quantity Q of the services that are about to be executed may be obtained through reverse calculation according to the foregoing equation and using the second difference 0.1 as $P_{th}$, as shown in the following expression:

$$0.1=0.0002\times Q, \text{ that is, } Q=500.$$

It may be seen that when the current electricity grid electricity price is less than the electricity price threshold, the service control apparatus increases the quantity of the services that are about to be executed by 500.

In this embodiment, the service control apparatus may determine an electricity price threshold according to a quantity of to-be-executed services, compare the electricity price threshold and a current electricity grid electricity price, and when the current electricity grid electricity price is greater than the electricity price threshold, decrease a quantity of services that are about to be executed, or when the current electricity grid electricity price is less than the electricity price threshold, increase a quantity of services that are about to be executed. The electricity price threshold in this embodiment depends on the quantity of the to-be-executed services such that load is adjusted not only based on a current electricity grid electricity price, and the quantity of the to-be-executed services is also considered. The quantity of the to-be-executed services changes in real time, and therefore, a cycle of adjusting the load is relatively short such that adjustment precision can be improved and costs of electricity expenses can be reduced.

Figure 5:
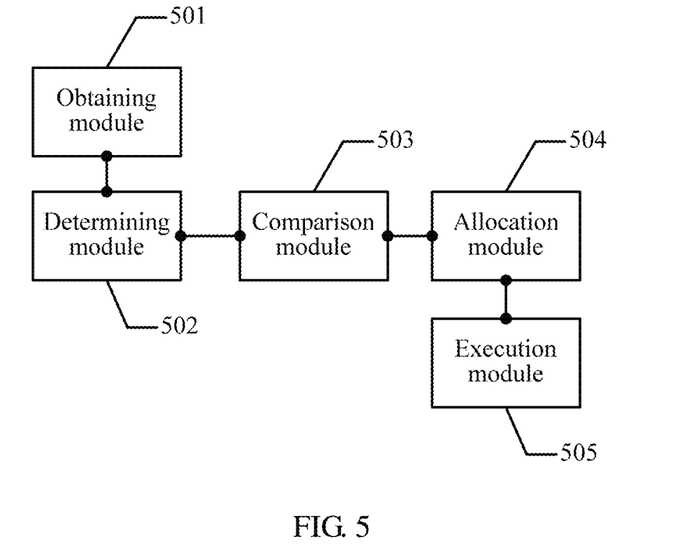
FIG. 5 is a schematic diagram of an embodiment of a service control apparatus according to an embodiment of the present disclosure.

The service control method in the embodiments of the present disclosure is described above, and the following describes the service control apparatus in the embodiments of the present disclosure. Referring to FIG. 5, an embodiment of the service control apparatus in the embodiments of the present disclosure includes an obtaining module 501 configured to obtain a current electricity grid electricity price and a quantity of to-be-executed services, a determining module 502 configured to determine an electricity price threshold according to the quantity of the to-be-executed services, where the quantity of the to-be-executed services is positively correlated with the electricity price threshold, a comparison module 503 configured to compare values of the current electricity grid electricity price and the electricity price threshold, an allocation module 504 configured to, if the current electricity grid electricity price is greater than the electricity price threshold, decrease a quantity of services that are about to be executed by a first quantity, or if the current electricity grid electricity price is less than the electricity price threshold, increase a quantity of services that are about to be executed by a second quantity, and an execution module 505 configured to execute a service according to a reduced or increased quantity of services that are about to be executed.

The determining module 502 is configured to obtain a target relationship factor, and set a product of the target relationship factor and the quantity of the to-be-executed services as the electricity price threshold.

The determining module 502 is further configured to obtain a first relationship parameter and a second relationship parameter, where the first relationship parameter is a parameter of a relationship between an electricity expenses reducing rate and the relationship factor, the second relationship parameter is a parameter of a relationship between the quantity of the to-be-executed services and the relationship factor, the electricity expenses reducing rate is positively correlated with the relationship factor, and the quantity of the to-be-executed services is positively correlated with the relationship factor, and the determining module 502 is configured to perform calculation according to the first relationship parameter and the second relationship parameter such that a relationship factor obtained when an equilibrium value is maximum is used as the target relationship factor, where the equilibrium value is positively correlated with the electricity expenses reducing rate, and the equilibrium value is inversely correlated with the quantity of the to-be-executed services.

The determining module 502 is further configured to determine the target relationship factor $\hat{v}$ in the following manner:

$$\hat{v} = \underset{v \in V}{\operatorname{argmax}}\{M(v)\}; \text{ and}$$

$$M(v) = \frac{\alpha * C(v)}{\beta * Q(v)},$$

where v is a relationship factor, V is a value range of the relationship factor, M(v) is an equilibrium value, C(v) is an electricity expenses reducing rate, Q(v) is a quantity of to-be-executed services, $\alpha$ is a first coefficient used to represent a weight of the electricity expenses reducing rate, and $\beta$ is a second coefficient used to represent a weight of the quantity of the to-be-executed services.

Optionally, the determining module 502 may further configured to obtain a sample data set $\phi=(P_{th}, Q)$ of the electricity price threshold and the quantity of the to-be-executed services by means of an offline test, where in the sample data set, the electricity price threshold $P_{th}$ is a dependent variable $p_{th}$, and the quantity Q of the to-be-executed services is an independent variable q, and the determining module 502 is configured to calculate the electricity price threshold according to the sample data set.

The determining module 502 may further configured to determine the electricity price threshold in the following manner:

$$\hat{p}_{th} = a + bq; \text{ and}$$

$$\varphi = \min \sum_\phi (p_{th,i} - \hat{p}_{th,i})^2,$$

that is, $$\varphi = \min \sum_\phi (p_{th,i} - a - bq_i)^2,$$

where $\hat{p}_{th}$ is a predictor of $p_{th}$, a and b are to-be-determined coefficients, $\varphi$ is a residual sum of squares, i is an element symbol of the sample data set, and $(p_{th,i}, q_i)$ represents an $i^{th}$ element pair in the sample data set.

The allocation module 504 is configured to calculate a first difference between the current electricity grid electricity price and the electricity price threshold if the current electricity grid electricity price is greater than the electricity price threshold, calculate the first quantity according to the first difference, calculate a second difference between the current electricity grid electricity price and the electricity price threshold if the current electricity grid electricity price is less than the electricity price threshold, and calculate the second quantity according to the second difference.

The allocation module 504 is configured to move the first quantity of deferrable services from the services that are about to be executed, to a queue of the to-be-executed services, or the allocation module 504 is configured to allocate the first quantity of deferrable services from the services that are about to be executed, to a first data center of a different region, where a current first electricity grid electricity price of the different region that is obtained by the first data center of the different region is less than the current electricity grid electricity price.

The allocation module 504 is configured to extract the second quantity of services from the to-be-executed services, and add the second quantity of services to a queue of the services that are about to be executed, or obtain the second quantity of services from a second data center of a different region, and add the second quantity of services to a queue of the services that are about to be executed, where a current second electricity grid electricity price of the different region that is obtained by the second data center of the different region is greater than the current electricity grid electricity price.

In this embodiment, the determining module 502 may determine an electricity price threshold according to a quantity of to-be-executed services that is obtained by the obtaining module 501, the comparison module 503 compares the electricity price threshold and a current electricity grid electricity price that is obtained by the obtaining module 501, when the current electricity grid electricity price is greater than the electricity price threshold, the allocation module 504 decreases a quantity of services that are about to be executed, or when the current electricity grid electricity price is less than the electricity price threshold, the allocation module 504 increases a quantity of services that are about to be executed, and the execution module 505 executes a service according to a quantity of services that are about to be executed and that are allocated by the allocation module 504. The electricity price threshold in this embodiment depends on the quantity of the to-be-executed services such that load is adjusted not only based on a current electricity grid electricity price, and the quantity of the to-be-executed services is also considered. The quantity of the to-be-executed services changes in real time, and therefore, a cycle of adjusting the load is relatively short such that adjustment precision can be improved and costs of electricity expenses can be reduced.

Figure 6:
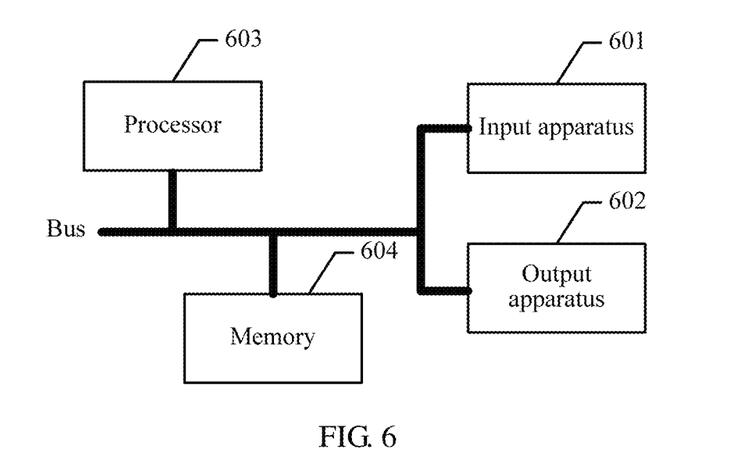
FIG. 6 is a schematic diagram of another embodiment of a service control apparatus according to an embodiment of the present disclosure.

The service control apparatus in the embodiments of the present disclosure is described above from a perspective of a modular functional entity, and the following describes the service control apparatus in the embodiments of the present disclosure from a perspective of hardware processing. Referring to FIG. 6, another embodiment of the service control apparatus in the embodiments of the present disclosure includes an input apparatus 601, an output apparatus 602, a processor 603, and a memory 604 (there may be one or more processors 603 in a network device, and FIG. 6 uses one processor 603 as an example). In some embodiments of the present disclosure, the input apparatus 601, the output apparatus 602, the processor 603, and the memory 604 may be connected using a bus or in another manner. Connection using the bus is used as an example in FIG. 6.

By calling an operation instruction stored in the memory 604, the processor 603 is configured to perform the following steps of obtaining a current electricity grid electricity price and a quantity of to-be-executed services, determining an electricity price threshold according to the quantity of the to-be-executed services, where the quantity of the to-be-executed services is positively correlated with the electricity price threshold, and if the current electricity grid electricity price is greater than the electricity price threshold, decreasing a quantity of services that are about to be executed by a first quantity, and executing a service according to a reduced quantity of services that are about to be executed, or if the current electricity grid electricity price is less than the electricity price threshold, increasing a quantity of services that are about to be executed by a second quantity, and executing a service according to an increased quantity of services that are about to be executed.

In some embodiments of the present disclosure, the processor 603 is further configured to perform the following steps of obtaining a target relationship factor, and setting a product of the target relationship factor and the quantity of the to-be-executed services as the electricity price threshold.

In some embodiments of the present disclosure, the processor 603 is further configured to perform the following steps of obtaining a first relationship parameter and a second relationship parameter, where the first relationship parameter is a parameter of a relationship between an electricity expenses reducing rate and the relationship factor, the second relationship parameter is a parameter of a relationship between the quantity of the to-be-executed services and the relationship factor, the electricity expenses reducing rate is positively correlated with the relationship factor, and the quantity of the to-be-executed services is positively correlated with the relationship factor, and performing calculation according to the first relationship parameter and the second relationship parameter such that a relationship factor obtained when an equilibrium value is maximum is used as the target relationship factor, where the equilibrium value is positively correlated with the electricity expenses reducing rate, and the equilibrium value is inversely correlated with the quantity of the to-be-executed services.

In some embodiments of the present disclosure, the processor 603 is further configured to perform the following steps determining the target relationship factor $\hat{v}$ in the following manner:

$$\hat{v} = \underset{v \in V}{\mathrm{argmax}}\{M(v)\},$$

$$M(v) = \frac{\alpha * C(v)}{\beta * Q(v)},$$

where v is a relationship factor, V is a value range of the relationship factor, M(v) is an equilibrium value, C(v) is an electricity expenses reducing rate, Q(v) is a quantity of to-be-executed services, α is a first coefficient used to represent a weight of the electricity expenses reducing rate, and β is a second coefficient used to represent a weight of the quantity of the to-be-executed services.

In some embodiments of the present disclosure, the processor 603 is further configured to perform the following steps of obtaining a sample data set $\phi=(P_{th}, Q)$ of the electricity price threshold and the quantity of the to-be-executed services by means of an offline test, where in the sample data set, the electricity price threshold $P_{th}$ is a dependent variable $p_{th}$, and the quantity Q of the to-be-executed services is an independent variable q, and calculating the electricity price threshold according to the sample data set.

In some embodiments of the present disclosure, the processor 603 is further configured to perform the following steps determining the electricity price threshold in the following manner:

$$\hat{p}_{th} = a + bq; \text{ and}$$

$$\varphi = \min \sum_{\phi} (p_{th,i} - \hat{p}_{th,i})^2,$$

that is, $$\varphi = \min \sum_{\phi} (p_{th,i} - a - bq_i)^2,$$

where $\hat{p}_{th}$ is a predictor of $p_{th}$, a and b are to-be-determined coefficients, φ is a residual sum of squares, i is an element symbol of the sample data set, and $(p_{th,i}, q_i)$ represents an $i^{th}$ element pair in the sample data set.

In some embodiments of the present disclosure, the processor 603 is further configured to perform the following steps if the current electricity grid electricity price is greater than the electricity price threshold, calculating a first difference between the current electricity grid electricity price and the electricity price threshold, and calculating the first quantity according to the first difference, or if the current electricity grid electricity price is less than the electricity price threshold, calculating a second difference between the current electricity grid electricity price and the electricity price threshold, and calculating the second quantity according to the second difference.

In some embodiments of the present disclosure, the processor 603 is further configured to perform the following steps of moving the first quantity of deferrable services from the services that are about to be executed, to a queue of the to-be-executed services, or allocating the first quantity of deferrable services from the services that are about to be executed, to a first data center of a different region, where a current first electricity grid electricity price of the different region that is obtained by the first data center of the different region is less than the current electricity grid electricity price.

In some embodiments of the present disclosure, the processor 603 is further configured to perform the following steps of extracting the second quantity of services from the to-be-executed services, and adding the second quantity of services to a queue of the services that are about to be executed, or obtaining the second quantity of services from a second data center of a different region, and adding the second quantity of services to a queue of the services that are about to be executed, where a current second electricity grid electricity price of the different region that is obtained by the second data center of the different region is greater than the current electricity grid electricity price.

In this embodiment, the processor 603 may determine an electricity price threshold according to a quantity of to-be-executed services, compare the electricity price threshold and a current electricity grid electricity price, and when the current electricity grid electricity price is greater than the electricity price threshold, decrease a quantity of services that are about to be executed, or when the current electricity grid electricity price is less than the electricity price threshold, increase a quantity of services that are about to be executed. The electricity price threshold in this embodiment depends on the quantity of the to-be-executed services such that load is adjusted not only based on a current electricity grid electricity price, and the quantity of the to-be-executed services is also considered. The quantity of the to-be-executed services changes in real time, and therefore, a cycle of adjusting the load is relatively short such that adjustment precision can be improved and costs of electricity expenses can be reduced.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the other approaches, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A service control method, comprising:
    obtaining, by a service control apparatus, a current electricity grid electricity price through an internet and a quantity of to-be-executed services ($Q(v)$) in a data center;
    setting, by the service control apparatus, an electricity price threshold ($P_{th}$) in the data center according to the $Q(v)$, wherein the $Q(v)$ is positively correlated with the $P_{th}$;
    decreasing, by the service control apparatus, a quantity of services about to be executed in the data center by a first quantity when the current electricity grid electricity price is greater than the $P_{th}$;
    increasing, by the service control apparatus, the quantity of services about to be executed in the data center by a second quantity when the current electricity grid electricity price is less than the $P_{th}$;
    executing, by the service control apparatus, a service in the data center according to a reduced or increased quantity of services about to be executed, such that an electrical load of the data center is adjusted based on the current electricity grid electricity price and the $Q(v)$;
    calculating, by the service control apparatus, a first difference between the current electricity grid electricity price and the $P_{th}$ when the current electricity grid electricity price is greater than the $P_{th}$;
    calculating, by the service control apparatus, the first quantity according to the first difference when the first difference is calculated;
    calculating, by the service control apparatus, a second difference between the current electricity grid electricity price and the $P_{th}$ when the current electricity grid electricity price is less than the $P_{th}$; and
    calculating, by the service control apparatus, the second quantity according to the second difference when the second difference is calculated.

2. The service control method of claim 1, wherein determining the $P_t$, comprises:
    obtaining, by the service control apparatus, a target relationship factor ($\hat{v}$); and
    setting, by the service control apparatus, a product of the $\hat{v}$ and the $Q(v)$ as the $P_{th}$.

3. The service control method of claim 2, wherein obtaining the comprises:
    obtaining, by the service control apparatus, a first relationship parameter and a second relationship parameter, wherein the first relationship parameter comprises a parameter of a relationship between an electricity expenses reducing rate ($C(v)$) and a relationship factor (v), the second relationship parameter comprises a parameter of a relationship between the $Q(v)$ and the v, wherein the $C(v)$ is positively correlated with the v, and wherein the $Q(v)$ is positively correlated with the v;
    performing, by the service control apparatus, calculation according to the first relationship parameter and the second relationship parameter; and
    setting a v obtained when an equilibrium value ($M(v)$) is maximum as the $\hat{v}$, wherein the $M(v)$ is positively correlated with the $C(v)$ and inversely correlated with the $Q(v)$.

4. The service control method of claim 3, wherein performing the calculation and setting the v obtained when the M(v) is maximum as the v̂ comprises:
   determining, by the service control apparatus, the v̂ in the following manner:

$$\hat{v} = \underset{v \in V}{\operatorname{argmax}} \{M(v)\}; \text{ and}$$
$$M(v) = \frac{\alpha * C(v)}{\beta * Q(v)},$$

wherein the V comprises a value range of the v, wherein the α comprises a first coefficient representing a weight of the C(v), and wherein the β comprises a second coefficient representing a weight of the Q(v).

5. The service control method of claim 1, wherein determining the $P_{th}$ comprises:
   obtaining, by the service control apparatus, a sample data set (φ=($P_{th}$, Q)) of the $P_{th}$ and the Q(v) by a pretest in the φ, wherein the $P_{th}$ comprises a dependent variable ($p_{th}$), and the Q(v) comprising an independent variable (q); and
   calculating, by the service control apparatus, the $P_{th}$ according to the φ.

6. The service control method of claim 5, wherein calculating the $P_{th}$ comprises:
   determining, by the service control apparatus, the $P_{th}$ in the following manner:

$$\hat{p}_{th} = a + bq;$$
$$\varphi = \min_{\phi} \sum (p_{th,i} - \hat{p}_{th,i})^2; \text{ and}$$
$$\varphi = \min_{\phi} \sum (p_{th,i} - a - bq_i)^2,$$

wherein the $\hat{p}_{th}$ comprises a predictor of $p_{th}$, wherein the a and the b comprises to-be-determined coefficients, wherein the φ comprises a residual sum of squares, wherein the i comprises an element symbol of the φ, and wherein the ($p_{th,i}$, $q_i$) represent an $i^{th}$ element pair in the φ.

7. The service control method of claim 1, wherein increasing the quantity of services about to be executed by the second quantity comprises:
   extracting, by the service control apparatus, the second quantity of services from the to-be-executed services, and adding the second quantity of services to a queue of the services about to be executed; or
   obtaining, by the service control apparatus, the second quantity of services from a second data center of a different region, and adding the second quantity of services to the queue of the services about to be executed, wherein a current second electricity grid electricity price of the different region obtained by the second data center of the different region is greater than the current electricity grid electricity price.

8. The service control method of claim 1, wherein decreasing the quantity of services about to be executed by the first quantity comprises:
   moving, by the service control apparatus, the first quantity of deferrable services from the services about to be executed to a queue of the to-be-executed services; or
   allocating, by the service control apparatus, the first quantity of deferrable services from the services about to be executed to a first data center of a different region, wherein a current first electricity grid electricity price of the different region obtained by the first data center of the different region is less than the current electricity grid electricity price.

9. A service control apparatus of a data center, comprising:
   a memory comprising instructions; and
   a processor coupled to the memory, wherein the instructions cause the processor to be configured to:
      obtain a current electricity grid electricity price through the internet and a quantity of to-be-executed services (Q(v)) in the data center;
      set an electricity price threshold ($P_{th}$) according to the Q(v), the Q(v) being positively correlated with the $P_{th}$;
      compare values of the current electricity grid electricity price and the $P_{th}$;
      decrease a quantity of services about to be executed in the data center by a first quantity when the current electricity grid electricity price is greater than the $P_{th}$;
      increase the quantity of services about to be executed by a second quantity when the current electricity grid electricity price is less than the $P_{th}$;
      execute a service according to a reduced or increased quantity of services about to be executed, such that an electrical load of the data center is adjusted based on the current electricity grid electricity price and the Q(v);
      calculate a first difference between the current electricity grid electricity price and the $P_{th}$ when the current electricity grid electricity price is greater than the $P_{th}$;
      calculate the first quantity according to the first difference and when the first difference is calculated;
      calculate a second difference between the current electricity grid electricity price and the $P_{th}$ when the current electricity grid electricity price is less than the $P_{th}$; and
      calculate the second quantity according to the second difference and when the second difference is calculated.

10. The service control apparatus of claim 9, wherein the instructions further cause the processor to be configured to:
    obtain a target relationship factor (v̂); and
    set a product of the v̂ and the Q(v) as the $P_{th}$.

11. The service control apparatus of claim 10, wherein the instructions further cause the processor to be configured to:
    obtain a first relationship parameter and a second relationship parameter, wherein the first relationship parameter comprises a parameter of a relationship between an electricity expenses reducing rate (C(v)) and a relationship factor (v), rein the second relationship parameter comprises a parameter of a relationship between the Q(v) and the v, wherein the C(v) is positively correlated with the v, and wherein the Q(v) is positively correlated with the v;
    perform calculation according to the first relationship parameter and the second relationship parameter; and
    set a v obtained when an equilibrium value (M(v)) is maximum as the v̂, wherein the M(v) is positively correlated with the C(v) and inversely correlated with the Q(v).

12. The service control apparatus of claim 11, wherein the instructions further cause the processor to be configured to: determine the $\hat{v}$ in the following manner:

$$\hat{v} = \underset{v \in V}{\operatorname{argmax}}\{M(v)\}; \text{ and}$$

$$M(v) = \frac{\alpha * C(v)}{\beta * Q(v)},$$

wherein the V comprises a value range of the v, wherein the $\alpha$ comprises a first coefficient representing a weight of the C(v), and wherein the $\beta$ comprises a second coefficient representing a weight of the Q(v).

13. The service control apparatus of claim 9, wherein the instructions further cause the processor to be configured to:
obtain a sample data set ($\phi = (P_{th}, Q)$) of the $P_{th}$ and the Q(v) by an offline test in the $\phi$, wherein the $P_{th}$ comprises a dependent variable ($p_{th}$), and the Q(v) comprising an independent variable (q); and
calculate the $P_{th}$ according to the $\phi$.

14. The service control apparatus of claim 13, wherein the instructions further cause the processor to be configured to: determine the $P_{th}$ in the following manner:

$$\hat{p}_{th} = a + bq;$$

$$\varphi = \min_{\phi} \sum (p_{th,i} - \hat{p}_{th,i})^2; \text{ and}$$

$$\varphi = \min_{\phi} \sum (p_{th,i} - a - bq_i)^2,$$

wherein the $p_{th}$ comprises a predictor of the $p_{th}$, wherein the a and the b comprises to-be-determined coefficients, wherein the $\varphi$ comprises a residual sum of squares, wherein the i comprises an element symbol of the $\phi$, and wherein the ($p_{th,i}$, $q_i$) represents an $i^{th}$ element pair in the $\phi$.

15. The service control apparatus of claim 9, wherein when the current electricity grid electricity price is less than the $P_{th}$, the instructions further cause the processor to be configured to:
extract the second quantity of services from the to-be-executed services, and add the second quantity of services to a queue of the services about to be executed; or
obtain the second quantity of services from a second data center of a different region, and add the second quantity of services to the queue of the services about to be executed, wherein a current second electricity grid electricity price of the different region obtained by the second data center of the different region is greater than the current electricity grid electricity price.

16. The service control apparatus of claim 9, wherein when the current electricity grid electricity price is greater than the $P_t$, the instructions further cause the processor to be configured to:
move the first quantity of deferrable services from the services about to be executed to a queue of the to-be-executed services; or
allocate the first quantity of deferrable services from the services about to be executed to a first data center of a different region, wherein a current first electricity grid electricity price of the different region obtained by the first data center of the different region than the current electricity grid electricity price.

\* \* \* \* \*

UNITED STATES PATENT AND TRADEMARK OFFICE
CERTIFICATE OF CORRECTION

PATENT NO. : 10,776,176 B2
APPLICATION NO. : 16/054605
DATED : September 15, 2020
INVENTOR(S) : Xiaosheng Zeng, Kai Xin and Xiaowen Dong Page 1 of 1

It is certified that error appears in the above-identified patent and that said Letters Patent is hereby corrected as shown below:

In the Claims

Claim 2, Column 20, Line 45: "the $P_t$ comprises" should read "the $P_{th}$ comprises"

Claim 3, Column 20, Line 51: "the comprises" should read "the $\hat{v}$ comprises"

Claim 3, Column 20, Line 57: "(v), the second" should read "(v), wherein the second"

Claim 11, Column 22, Line 57: "factor (v), rein the second" should read "factor (v), wherein the second"

Claim 14, Column 24, Line 1: "the $P_{th}$" should read "the $\hat{p}_{th}$"

Claim 16, Column 24, Line 24: "the $P_t$ instructions" should read "the $P_{th}$ instructions"

Signed and Sealed this
Third Day of November, 2020

Andrei Iancu
*Director of the United States Patent and Trademark Office*